United States Patent
Suurpaa et al.

(10) Patent No.: US 9,360,890 B2
(45) Date of Patent: Jun. 7, 2016

(54) COVER FOR AN ELECTRONIC DEVICE AND ELECTRONIC DEVICE WITH A COVER

(75) Inventors: Kalle Suurpaa, Helsinki (FI); Antti Kujala, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 1505 days.

(21) Appl. No.: 10/516,887

(22) PCT Filed: Jun. 27, 2002

(86) PCT No.: PCT/IB02/02504
§ 371 (c)(1),
(2), (4) Date: Jul. 25, 2005

(87) PCT Pub. No.: WO2004/003836
PCT Pub. Date: Jan. 8, 2004

(65) Prior Publication Data
US 2006/0055677 A1   Mar. 16, 2006

(51) Int. Cl.
*G06F 3/0488* (2013.01)
*G06F 1/16* (2006.01)
*H04M 1/725* (2006.01)
*H04M 1/02* (2006.01)

(52) U.S. Cl.
CPC ......... *G06F 1/1632* (2013.01); *H04M 1/72575* (2013.01); *H04M 1/0283* (2013.01); *H04M 2250/22* (2013.01)

(58) Field of Classification Search
CPC .... G06F 3/0488; G06F 3/04883; G06F 3/044
USPC ................. 345/156, 158, 166, 184, 168–169, 345/172–175; 178/18.01, 18.09, 178/18.05–18.07; 361/807; 455/575.1; D14/138; 379/433.01
See application file for complete search history.

(56) References Cited

U.S. PATENT DOCUMENTS

| | | | |
|---|---|---|---|
| 5,404,267 A * | 4/1995 | Silva et al. | 361/683 |
| 5,511,983 A * | 4/1996 | Kashii et al. | 434/365 |
| 5,677,711 A | 10/1997 | Kuo | |
| 6,128,475 A * | 10/2000 | Wicks et al. | 455/575.4 |
| 6,208,271 B1 * | 3/2001 | Armstrong | 341/34 |
| 6,222,525 B1 * | 4/2001 | Armstrong | 345/161 |
| 6,259,045 B1 * | 7/2001 | Imai | 200/5 A |
| 6,317,313 B1 * | 11/2001 | Mosgrove et al. | 361/679.3 |
| 6,400,303 B2 * | 6/2002 | Armstrong | 341/176 |
| 6,492,978 B1 * | 12/2002 | Selig et al. | 345/173 |
| 6,518,953 B1 * | 2/2003 | Armstrong | 345/159 |

(Continued)

FOREIGN PATENT DOCUMENTS

| | | |
|---|---|---|
| CN | 1285989 | 2/2001 |
| CN | 1321289 | 11/2001 |

(Continued)

*Primary Examiner* — Kumar Patel
*Assistant Examiner* — Mansour M Said
(74) *Attorney, Agent, or Firm* — Alston & Bird LLP

(57) ABSTRACT

The invention relates to a cover comprising a decoration 11 which is visible to a user when the cover is connected to an electronic device. In order to enhance the functions provided by such a cover, it is proposed that the cover further comprises contact sensitive means 22, 23 arranged such that they generate an electrical signal when a part 12 of the decoration 11 associated to the contact sensitive means 22, 23 is touched, and connection means 24, 25 for electrically connecting the contact sensitive means 22, 23 to processing means. The invention relates equally to an electronic device with such a cover.

22 Claims, 2 Drawing Sheets

(56) References Cited

U.S. PATENT DOCUMENTS

| | | | | |
|---|---|---|---|---|
| 6,661,399 | B1* | 12/2003 | Oh et al. | 345/87 |
| 6,898,283 | B2* | 5/2005 | Wycherley et al. | 379/433.11 |
| 6,999,804 | B2* | 2/2006 | Engstrom et al. | 455/575.3 |
| 7,149,559 | B2* | 12/2006 | Qin et al. | 455/575.8 |
| 7,187,363 | B2* | 3/2007 | Nguyen et al. | 345/168 |
| 7,268,673 | B2* | 9/2007 | Wolff | 340/407.1 |
| 7,305,260 | B2* | 12/2007 | Vuori et al. | 455/575.8 |
| 7,373,180 | B2* | 5/2008 | Swanson et al. | 455/566 |
| 7,599,709 | B2* | 10/2009 | Kim | 455/550.1 |
| 2002/0000978 | A1 | 1/2002 | Gerpheide | |
| 2003/0017848 | A1* | 1/2003 | Engstrom et al. | 455/558 |
| 2003/0153281 | A1* | 8/2003 | Abbasi et al. | 455/90 |
| 2004/0101029 | A1* | 5/2004 | Brunvoll | 374/163 |
| 2005/0032557 | A1* | 2/2005 | Brunstrom et al. | 455/575.1 |

FOREIGN PATENT DOCUMENTS

| | | |
|---|---|---|
| EP | 01017209 | 7/2000 |
| EP | 1107101 | 6/2001 |
| KR | 2001-40410 | 1/2003 |
| WO | WO 01/18966 | 3/2001 |

\* cited by examiner

COVER FOR AN ELECTRONIC DEVICE AND ELECTRONIC DEVICE WITH A COVER

FIELD OF THE INVENTION

The invention relates to a cover for an electronic device comprising a decoration which is visible to a user when the cover is connected to an electronic device. The invention relates equally to an electronic device with such a cover.

BACKGROUND OF THE INVENTION

It is well known to provide an electronic device like a mobile phone with an exchangeable cover, in order to protect the device or to give a desired appearance to the device.

A desired decoration can be realized for example by coloring the outer surface of the cover. Alternatively; a desired decoration can be realized with a preformed customized in-molding (CIM) sheet onto which a desired decoration is printed and which is fitted into a corresponding transparent mould in the cover.

It has also been proposed to employ covers with active decorations, which change their appearance according to some conditions or according to provided signals.

In document EP 1 017 209 A2, for instance, a cover is presented which includes liquid crystals changing their color with changes of temperature. Thereby, selected parts of the cover can be caused to change their color at predetermined temperatures.

For achieving an active decoration, it is moreover possible to integrate light emitting diodes (LEDS) into the cover, which LEDs are switched on and off according to signals provided by a micro-controller provided in the cover. The light provided by switched on LEDs is then visible to a user through the outer surface of the cover.

Instead of LEDs, also an electro-luminance decoration can be employed, in which electro-luminance patterns are controlled by a micro-controller of the cover. Covers with electro-luminance decoration can be manufactured like current CIM sheet decoration covers, i.e. electro-luminance patterns are printed on a film, which is preformed like current CIM sheets, and fitted into a corresponding mould of the cover.

SUMMARY OF THE INVENTION

It is an object of the invention to further enhance the functions a cover provides for an electronic device.

This object is reached according to the invention with a cover for an electronic device comprising a decoration which is visible to a user when said cover is connected to an electronic device. It is understood that the reference to a connection to an electronic device is only used for defining the side of the cover on which a decoration has at least to be present. It does not restrict the scope of protection to a cover that is actually connected to an electronic device. It is proposed that the cover further comprises contact sensitive means arranged such that they generate an electrical signal when a part of the decoration associated to the contact sensitive means is touched. It is understood that touching the decoration means touching the outer surface of the cover via which a decoration is presented to a user. It is also understood that the expression touching the decoration may include the requirement of applying a certain pressure. Moreover, it is propose that the cover comprises connection means for electrically connecting the contact sensitive means to processing means.

The object of the invention is equally reached with an electronic device comprising such a cover.

The invention proceeds from the idea that a cover can provide an interactive decoration, if contact sensitive means, in particular pressure sensitive means, are included in the cover for detecting a touching of the presented decoration or a touching of predetermined parts of the decoration. If in addition connecting means to some processing means are provided in the cover, the signals generated by the contact sensitive means can be provided to some processing means suited to realize a specific function. Thus, a user may call a function simply by touching or pressing the cover.

It is an advantage of the invention that it provides added value to a user by creating a simple user interface and inter-action features.

Preferred embodiments of the invention become apparent from the subclaims.

The interactive decoration according to the invention can be realized with various technologies.

The contact sensitive means can be realized for example in form of a film. Such a film can comprise e.g. a printed on force sensitive resistors. It can also be an electromechanical film (EMFi™), which generates an electric charge when it is exposed to dynamic mechanical energy.

In case the contact sensitive means are realized as film, this film can be connected to a decoration film employed for presenting a specific decoration to a user. The combined films can then be inserted into the mould of a cover just like a conventional CIM sheet. In case a force sensitive resistor is to be employed for the contact sensitive means, the resistor can also be printed directly onto the backside of the decoration film.

It is an advantage of a film acting as contact sensitive means that only a small number of wires is required for connecting the contact sensitive means to processing means, for instance via a printed wiring board (PWB) provided in the cover.

Further, the contact sensitive means can be realized for example with printed capacitive wires in a decoration film employed for presenting a specific decoration to a user. This approach requires particularly simple mechanics and is based on a well known technology.

Processing means employed for processing the signals generated by the contact sensitive means may also interact with a micro-controller used for controlling electro-luminace patterns in the decoration or for controlling LEDs provided in the cover.

The interactive decoration can be a "stand-alone" system, which interacts exclusively with processing means located within the cover. Alternatively, the interactive decoration of a cover can be connected electrically to processing means in an electronic device to which the cover is connected. Thereby, the cover can be used as an input device for specific functions provided by the electronic device. In case there is a data connection between the cover and the electronic device, the cover can be further enhanced to provide a forced feedback, for example with the aid of a vibra motor included in the cover.

The invention can be employed for a great variety of applications. It can be used, for example, for controlling an MP3 (moving picture expert group layer 3) player integrated in the cover or in an electronic device to which the cover is connected. In connection with an MP3 player, there might also be a representation of a record player printed onto a decoration film, while a virtual rotating record is presented by electro-luminance sectors in the decoration film. The user can then "scratch" the music output by the MP3 player by "rotating" the presented virtual record by finger, in case contact sensitive means are associated in addition to the virtually rotating record.

Moreover, the invention can be used for realizing e.g. electric drums, or a piano keyboard of which the keys are presented as decoration. In case such a keyboard decoration is realized as active decoration, the keyboard may even constitute a teaching keyboard, which indicates the respective key that is to be played for a specific tune by a corresponding illumination.

In case the cover is designed to provide ringing tones via a micro-controller, the invention might also enable a user of the electronic device to teach the micro-controller new sequences of notes. This does not require any additional data connection to the electronic device, and it provides an alternative way to program the micro-controller of the cover with special ringing tones.

The electronic device according to the invention can be in particular a mobile phone, and the cover according to the invention can be in particular an exchangable cover for a mobile phone.

BRIEF DESCRIPTION OF THE FIGURES

Other objects and features of the present invention will become apparent from the following detailed description considered in conjunction with the accompanying drawings.

DETAILED DESCRIPTION OF THE INVENTION

Figure 1:
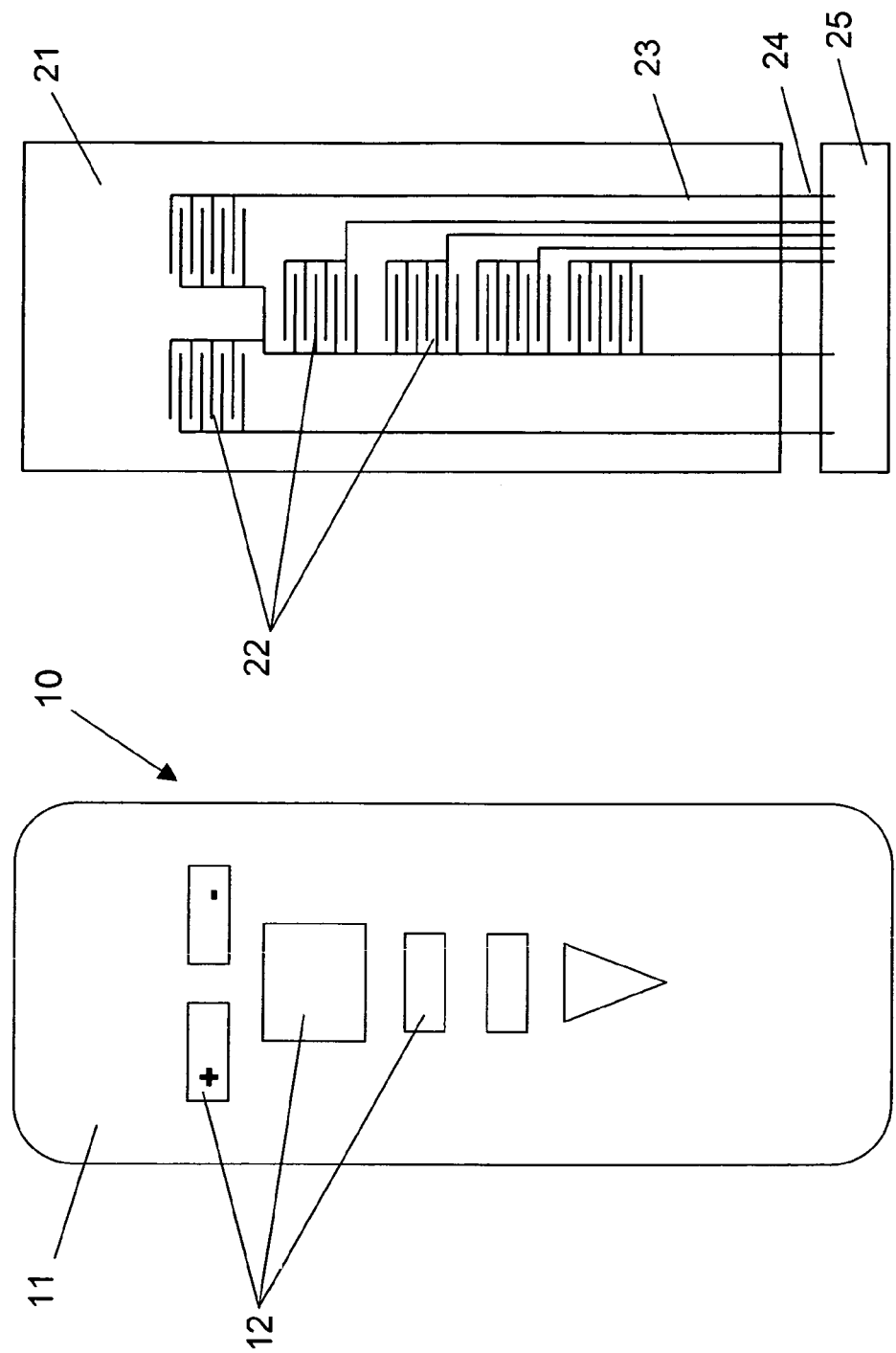
FIG. 1 illustrates an embodiment of a cover according to the invention.

FIG. 1 illustrates an embodiment of a cover 10 according to the invention, which uses a capacitive key wire printing. The cover comprises an MP3 player and is connected to a mobile phone 31. This cover as shown can be an exchangable cover configured for a mobile phone.

On the left hand side of FIG. 1, the decoration 11 of the cover which is visible to a user of the mobile phone is presented. The decoration is printed on a preformed CIM sheet, which was fitted into a transparent mould of the cover. The decoration 11 consists in a representation of six control buttons 12 of an MP3 player, including e.g. play, stop and volume buttons. The decoration may also comprise electro-luminance patterns 37, which support the presentation by illuminating certain parts of the decoration based on signals provided by a micro-controller 34 of the cover.

The CIM sheet 21 comprises in addition conductive printed wires. The arrangement of these wires is shown on the right hand side of FIG. 1. As can be seen in the figure, a separate capacitive sensor 22 is associated to each button 12 represented by the decoration 11 on the left hand side. Each capacitive sensor 22 is arranged in the CIM sheet 21 immediately behind the representation of the associated button 12 on the surface of the CIM sheet.

For forming a separate capacitive sensor 22 for each of the six represented buttons 12, seven printed wires 23 are provided in the CIM sheet 21. These printed wires 23 are connected at the rim of the CIM sheet 21 to connection pins 24. In the CIM sheet 21, a respective plurality of open-ended parallel wires branches off at six different positions from a first one of the printed wires. Each set of the branched-off parallel wires extends behind a different one of the represented buttons 12. Moreover, each of the remaining six printing wires 23 splits up once into a plurality of open-ended parallel wires. The open-ended parallel wires of the remaining six printing wires 23 also extend behind a respective one of the six represented buttons 12, but from an opposite side than the parallel wires branched-off from the first printing wire which extend behind the respective represented button 12. The open-ended parallel wires of the respective two printed wires 23 further alternate behind each represented button 12. Thereby, the printed wires 23 form a separate capacitive sensors 22 for each button 12.

A change of capacity in each of the six formed capacitive sensors 22 can be detected unequivocally between a different pair of connection pins 24.

Figure 2:
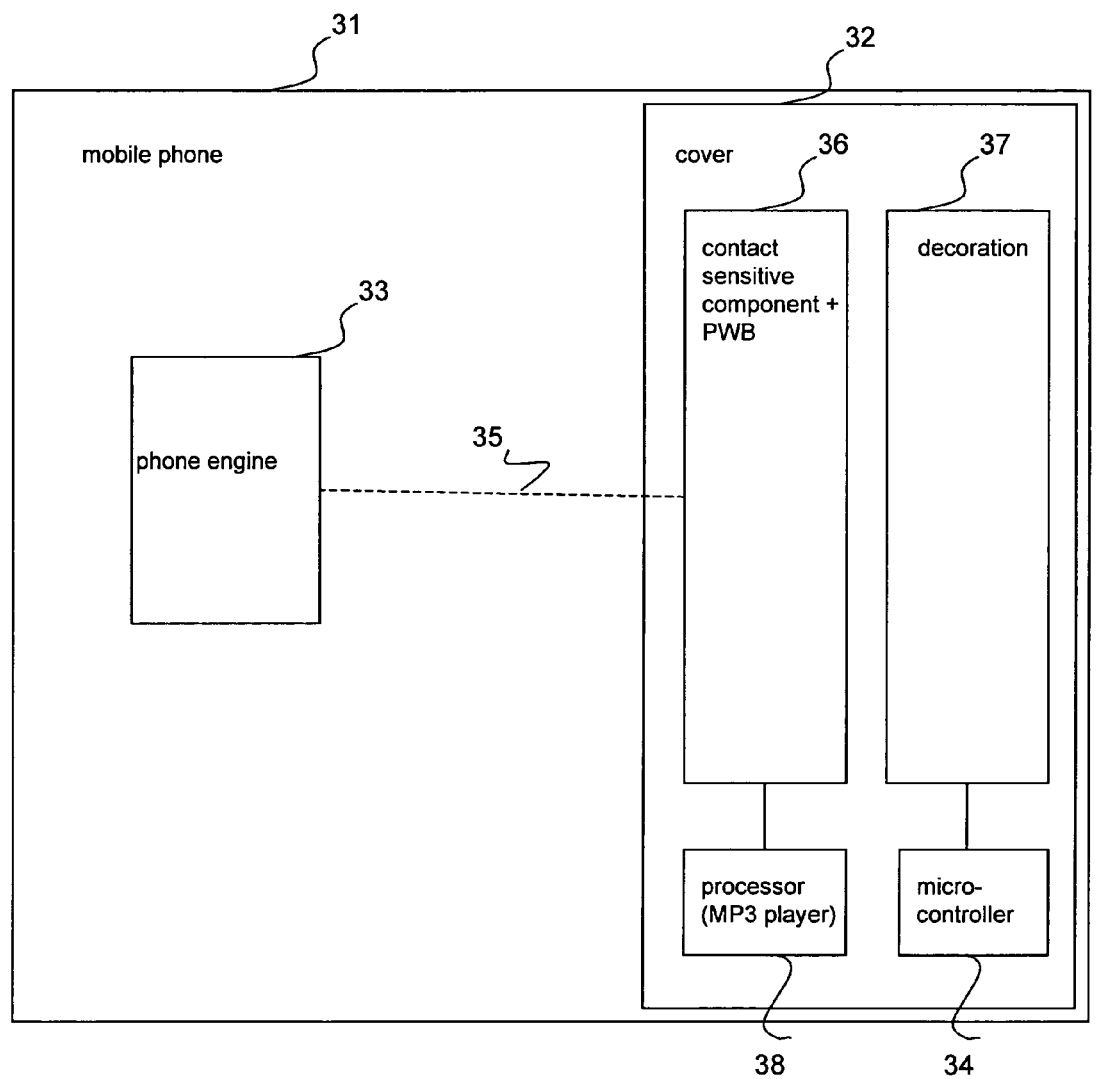
FIG. 2 illustrates a processor (in the form of an MP3 player) 38 to which the "contact sensitive component" plus the printed wiring board (PWB) 36 is connected.

The connection pins 24 are further connected to the PWB 25 of the cover (reference 36 in FIG. 2), to which also the MP3 player 38 of the cover is connected.

A user of the mobile phone wishing to make use of the MP3 player integrated in the cover may touch one of the represented buttons 12, for example a represented play button. This leads to a change of capacity in the capacitive sensor 22 arranged behind the touched button 12. The change of capacity in this specific capacitive sensor 22 is registered by the MP3 player via the associated connection pins 24 and the PWB 25. As a result, the MP3 player will call the function associated to the touched button 12, e.g. the play function.

In an alternative embodiment, the MP3 player is comprised in the mobile phone, not in the cover itself. In this case, a data transfer connection 35 indicating a respective change of capacity has to be enabled via the PWB 36 between the cover 32 and the phone engine 33.

It is to be noted that the described embodiments constitute only selected ones of a great variety of possible embodiments of the invention.

The invention claimed is:

1. An exchangeable cover for an electronic device, said cover configured to protect the electronic device, the exchangeable cover comprising, independent of attachment of said cover to said electronic device:
   a decoration in said exchangeable cover, which decoration is visible to a user;
   a contact sensitive component in said exchangeable cover arranged such that it generates an electrical signal when a part of said decoration associated to said contact sensitive component is touched;
   a processor provided in said exchangeable cover; and
   a connection component in said exchangeable cover configured to electrically connect said contact sensitive component to said processor, wherein said processor is configured to be provided with said electrical signal generated by said contact sensitive component to at least realize a specific function, wherein different parts of said decoration associated to said contact sensitive component result in a generation of different signals by said contact sensitive component when touched.

2. The exchangeable cover according to claim 1, wherein said contact sensitive component comprises a pressure sensitive film.

3. The exchangeable cover according to claim 2, wherein said pressure sensitive film is an electromechanical film.

4. The exchangeable cover according to claim 2, wherein said pressure sensitive film comprises at least one force sensitive resistor.

5. The exchangeable cover according to claim 1, wherein said contact sensitive component comprises at least one capacitive sensor.

6. The exchangeable cover according to claim 5, wherein different parts of said decoration associated to said contact sensitive component result in a generation of different signals by said contact sensitive component when touched.

7. The exchangeable cover according to claim 5, wherein one or more selected parts of said decoration are associated to one or more functions enabled by a processor to which said contact sensitive component can be connected via said connection component.

8. The exchangeable cover according to claim 5, wherein said decoration comprises at least one light emitting diode which is controllable by a processing component.

9. The exchangeable cover according to claim 5, wherein said decoration comprises at least one electro-luminance pattern which is controllable by a processing component.

10. The exchangeable cover according to claim 1, wherein one or more selected parts of said decoration are associated to one or more functions enabled by a processor to which said contact sensitive component can be connected via said connection component.

11. The exchangeable cover according to claim 1, wherein said decoration comprises at least one light emitting diode which is controllable by a processing component.

12. The exchangeable cover according to claim 1, wherein said decoration comprises at least one elector-luminance pattern which is controllable by a processing component.

13. An electronic device comprising an exchangeable cover, said cover configured to protect the electronic device, which cover comprises independent of attachment of said cover to said electronic device;
   a decoration in said exchangeable cover which decoration is visible to a user;
   a contact sensitive component in said exchangeable cover arranged such that it generates an electrical signal when a part of said decoration associated to said contact sensitive component is touched;
   a processor in said exchangeable cover; and
   a connection component in said exchangeable cover configured to electrically connect said contact sensitive component to said processor, wherein said processor is configured to be provided with said electrical signal generated by said contact sensitive component to at least realize a specific function, wherein different parts of said decoration associated to said contact sensitive component result in a generation of different signals by said contact sensitive component when touched.

14. The electronic device according to claim 13 comprising a data connection to said exchangeable cover and a processing component configured to process data received by said contact sensitive component of said exchangeable cover.

15. The electronic device according to claim 13, wherein said contact sensitive component of said exchangeable cover comprises a pressure sensitive film.

16. The electronic device according to claim 15, wherein said pressure sensitive film is an electromechanical film.

17. The electronic device according to claim 15, wherein said pressure sensitive film comprises at least one force sensitive resistor.

18. The electronic device according to claim 13, wherein said contact sensitive component comprises at least one capacitive sensor.

19. The electronic device according to claim 13, wherein one or more selected parts of said decoration are associated to one or more functions enabled by a processor to which said contact sensitive component can be connected via said connection component.

20. The electronic device according to claim 13, wherein said decoration comprises at least one light emitting diode which is controllable by a processing component.

21. The electronic device according to claim 13, wherein said decoration comprises at least one electro-luminance pattern which is controllable by a processing component.

22. An exchangeable cover, said cover configured to protect an electronic device, comprising, independent of attachment of said cover to said electronic device:
   means for presenting decoration in said exchangeable cover which decoration is visible to a user;
   means for generating an electrical signal when a part of said decoration is touched;
   means for providing a processor in said exchangeable cover; and
   means for electrically connecting in said exchangeable cover said means for generating an electrical signal to said processor, wherein said processor is configured to be provided with said electrical signal generated by said means for generating an electrical signal to at least realize a specific function, wherein different parts of said decoration associated to said contact sensitive component result in a generation of different signals by said contact sensitive component when touched.

\* \* \* \* \*